No. 771,284. PATENTED OCT. 4, 1904.
C. P. STEINMETZ.
DYNAMO ELECTRIC MACHINE.
APPLICATION FILED APR. 30, 1900.
NO MODEL.

Witnesses:
Lewis B. Abell.
Benjamin B. Hull

Inventor.
Charles P. Steinmetz
by Albert G. Davis
Atty.

No. 771,284. Patented October 4, 1904.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

DYNAMO-ELECTRIC MACHINE.

SPECIFICATION forming part of Letters Patent No 771,284, dated October 4, 1904.

Application filed April 30, 1900. Serial No. 14,791. (No model.)

*To all whom it may concern:*

Be it known that I, CHARLES P. STEINMETZ, a citizen of the United States, residing at Schenectady, county of Schenectady, State of New York, have invented certain new and useful Improvements in Dynamo-Electric Machines, of which the following is a specification.

In the inductor-dynamo different inductor-poles are in multiple with each other magnetically, so that the total magnetic flux divides between the poles in proportion to their respective reluctances. If the different poles are of different reluctances, it will therefore be evident that the magnetic flux through the poles will differ. Thus, for example, if the armature or the bearings are slightly out of center and the air-gap of the machine therefore larger on one side than on the other the magnetic flux on the side of the larger air-gap will be less than on the side of the smaller air-gap, so that if the machine were operated on a three-wire system with one side of the armature feeding one side of the three-wire system and the other side of the armature the other side of the three-wire system the voltages would be permanently unequal. If the inductor is slightly eccentric to its axis of rotation, the air-gap will vary between a maximum and a minimum throughout each revolution, thereby causing a pulsation of magnetic flux corresponding to the speed of the machine. This pulsation not only causes energy losses in the machine, but also gives rise to a pulsation of voltage which when the machine feeds a three-wire system may become particularly noticeable. To overcome these difficulties, I propose to arrange the generating-coils of the machine so that alternate coils are connected to one side of the three-wire system and the remaining coils to the other side. By this arrangement although the voltage of individual coils may be varied they are so grouped together that the voltage on one side of the system is always equal to that on the other side.

Another means which I may employ for carrying out my invention is to provide the machine with two independent sets of generating-coils, one set being superposed upon the other.

My invention in its details and mode of application will best be understood by reference to the following description, taken in connection with the accompanying drawings, while its scope will be particularly pointed out in the claims appended hereto.

Figure 1:
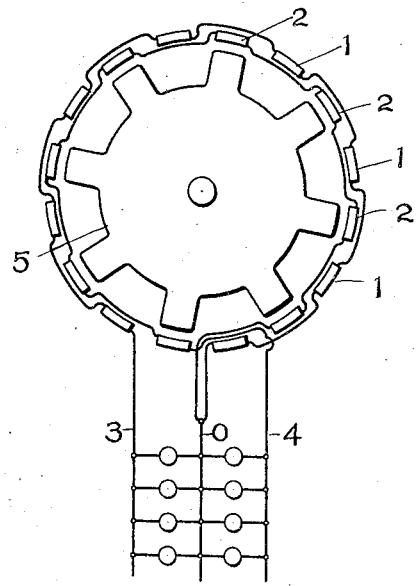
Figure 2:
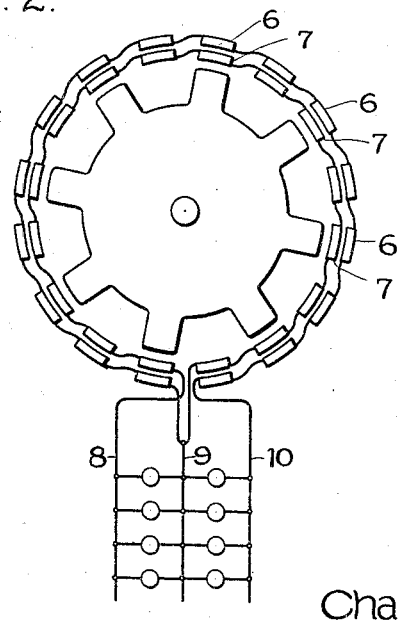

Figure 1 represents an embodiment of my invention, and Fig. 2 a modification.

As my invention consists chiefly in the arrangement of generating-coils for inductor-dynamos and does not relate to details of construction it is capable of clear illustration by means of diagrams. I may observe, however, that it may be embodied in structures widely diverse in character, a suitable form of machine being shown, for example, in my Patent No. 594,145, granted November 23, 1897.

In the diagram designated as Fig. 1 two sets of generating-coils 1 and 2 are shown, the coils of each set being arranged alternately with respect to the coils of the other set. The coils of the set 1 are connected in series with those of the set 2, the free terminals being connected to the outside mains 3 4 of the three-wire distribution system and the common connection to the neutral conductor 0. The inductor operating in conjunction with these coils is indicated at 5.

In Fig. 2 there are two sets of generating-coils 6 7, as in Fig. 1; but these coils, unlike those of Fig. 1, are superposed upon each other and not alternately arranged. The coils of one set therefore give rise to the same voltages as the coils of the other set, so that when the voltage of the coils of one set varies the voltage of the other set varies correspondingly. The voltages impressed upon the two sides of the three-wire system 8 9 10 therefore maintain an equality regardless of whether the inductor sags in its bearings or otherwise gets out of line with its coöperating member.

What I claim as new, and desire to secure by Letters Patent of the United States, is—

1. In an inductor-alternator, the combination of an inductor and two sets of coils relatively movable with respect to the inductor and all acted upon by the same poles of the inductor, the coils of one set being alternately arranged with respect to the coils of the other set.

2. In an inductor-alternator, the combination of two sets of generator-coils in substantially the same plane the individual coils of one set being arranged alternately with respect to the coils of the other set.

3. In an inductor-alternator, the combination of an inductor, and two sets of generator-coils acted upon by the same poles of the inductor and so arranged with respect to the inductor that the voltage of one set bears a definite relation to that of the other set regardless of the position of the inductor.

4. The combination of an inductor-alternator provided with two sets of generator-coils lying in substantially the same plane, the coils of one set being arranged alternately with respect to the coils of the other set, and a three-wire system fed by said coils.

5. The combinaton of an inductor-alternator provided with an inductor and sets of generator-coils of the same phase acted upon by the same poles of the inductor and arranged so that the voltage of one set bears a definite relation to that of another set regardless of the position of the inductor, and a three-wire system fed by said coils.

6. The combination of an inductor-alternator provided with an inductor having a circularly-arranged set of poles and two sets of coils inductively related to said set of poles, the coils of each set being arranged symmetrically with respect to said poles, and a three-wire system connected to said coils.

7. In an inductor-alternator, the combination of an inductor, and a plurality of sets of coils acted upon by the same poles of the inductor and giving rise to induced electromotive forces of the same phase and so arranged with respect to said inductor that the voltages of the respective sets bear a definite relation to each other regardless of the position, of the inductor, and a multiple-wire system of distribution fed from said coils.

In witness whereof I have hereunto set my hand this 27th day of April, 1900.

CHARLES P. STEINMETZ.

Witnesses:
BENJAMIN B. HULL,
ALEX. F. MACDONALD.